United States Patent
Goto et al.

(10) Patent No.: US 10,497,946 B2
(45) Date of Patent: Dec. 3, 2019

(54) FUEL CELL

(71) Applicant: HONDA MOTOR CO., LTD., Tokyo (JP)

(72) Inventors: Shuhei Goto, Wako (JP); Seiji Sugiura, Wako (JP); Kentaro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 451 days.

(21) Appl. No.: 15/065,862

(22) Filed: Mar. 10, 2016

(65) Prior Publication Data

US 2016/0268618 A1 Sep. 15, 2016

(30) Foreign Application Priority Data

Mar. 12, 2015 (JP) ................................. 2015-048969

(51) Int. Cl.
*H01M 8/0273* (2016.01)
*H01M 8/0276* (2016.01)

(52) U.S. Cl.
CPC ........ *H01M 8/0273* (2013.01); *H01M 8/0276* (2013.01)

(58) Field of Classification Search
CPC ............. H01M 8/0273; H01M 8/0276; H01M 8/0297; H01M 8/0271; H01M 8/242
See application file for complete search history.

(56) References Cited

U.S. PATENT DOCUMENTS

| 7,351,490 B2 | 4/2008 | Tanaka et al. |
| 8,252,480 B2 | 8/2012 | Kim et al. |
| 8,642,230 B2 * | 2/2014 | Kawashima ........ H01M 8/0273 429/508 |

(Continued)

FOREIGN PATENT DOCUMENTS

| JP | 2002-305006 | 10/2002 |
| JP | 4505188 B2 | 8/2004 |

(Continued)

OTHER PUBLICATIONS

Japanese Office Action for corresponding JP Application No. 2015-048969, dated Dec. 4, 2018 (w/ machine translation).

*Primary Examiner* — Milton I Cano
*Assistant Examiner* — Philip A. Stuckey
(74) *Attorney, Agent, or Firm* — Mori & Ward, LLP

(57) ABSTRACT

A first sealing member includes a first flat sealing portion facing a first electrode, a second flat sealing portion, and a first protruding sealing portion. The second flat sealing portion is opposite to the first electrode in the stacking direction. The first protruding sealing portion protrudes from the second flat sealing portion in the stacking direction and includes a crossing portion at which the first protruding sealing portion diverges. A second sealing member includes a third flat sealing portion facing a second electrode, a second protruding sealing portion, and a block-shaped seal. The second protruding sealing portion protrudes from the third flat sealing portion in the stacking direction. The block-shaped seal is disposed in a region corresponding to the crossing portion viewed in a stacking direction and protruding from the third flat sealing portion apart from the second protruding sealing portion.

6 Claims, 7 Drawing Sheets

(56) References Cited

U.S. PATENT DOCUMENTS

| | | | | |
|---|---|---|---|---|
| 2002/0102453 A1* | 8/2002 | Suenaga | ............. | H01M 8/0273 |
| | | | | 429/465 |
| 2005/0079400 A1* | 4/2005 | Sugiura | ............... | H01M 8/0206 |
| | | | | 429/483 |
| 2005/0255367 A1* | 11/2005 | Takahashi | ........... | H01M 8/0265 |
| | | | | 429/434 |
| 2012/0178011 A1* | 7/2012 | Sugiura | ............... | H01M 8/0273 |
| | | | | 429/457 |
| 2014/0011111 A1* | 1/2014 | Mitsuta | ............... | H01M 8/0273 |
| | | | | 429/481 |

FOREIGN PATENT DOCUMENTS

| | | |
|---|---|---|
| JP | 2013-171653 | 9/2013 |
| JP | 2014-026960 | 2/2014 |

* cited by examiner

FUEL CELL

CROSS-REFERENCE TO RELATED APPLICATIONS

The present application claims priority under 35 U.S.C. § 119 to Japanese Patent Application No. 2015-048969, filed Mar. 12, 2015, entitled "Fuel Cell." The contents of this application are incorporated herein by reference in their entirety.

BACKGROUND

Field of the Invention

The present disclosure relates to a fuel cell.

Discussion of the Background

In general, a solid polymer electrolyte fuel cell includes a solid polymer electrolyte membrane, which is a solid polymer ion-exchange membrane. The fuel cell includes a membrane electrode assembly (MEA), in which an anode electrode is disposed on one side of the solid polymer electrolyte membrane and a cathode electrode is disposed on the other side of the solid polymer electrolyte membrane. The membrane electrode assembly and separators (bipolar plates), sandwiching the membrane electrode assembly therebetween, constitute a fuel cell. Typically, a predetermined number of such fuel cells are stacked to form a fuel cell stack, which is used, for example, as an automobile fuel cell stack.

In the fuel cell, a fuel gas, an oxidant gas, and a coolant need to flow along distinct channels that are gastightly (liquid-tightly) sealed. Accordingly, sealing members, having various shapes, are usually disposed between the membrane electrode assembly and the separators.

For example, Japanese Patent No. 4505188 describes an example of a fuel cell. It is described that, with the fuel cell, interference between sealing members is avoided, increase of surface-contact pressure and line-contact pressure can be suppressed, sealability can be reliably maintained, and a desired power generation performance can be achieved.

SUMMARY

According to one aspect of the present disclosure, a fuel cell includes a membrane electrode assembly, in which an electrolyte membrane is disposed between a pair of electrodes; a first separator stacked on the membrane electrode assembly; and a second separator stacked on the membrane electrode assembly. In the fuel cell, the first separator includes a first sealing member, and the second separator, which is adjacent to the first separator, includes a second sealing member. According to a second aspect of the present disclosure, a fuel cell includes a membrane electrode assembly and a separator stacked on the membrane electrode assembly. In the fuel cell, the separator includes a first sealing member disposed on a first surface thereof and a second sealing member disposed on a second surface thereof.

The first sealing member includes a first protruding sealing portion that protrudes in a stacking direction in which the membrane electrode assembly and the separators are stacked, and a crossing portion where parts of the first protruding sealing portion are connected to each other. The second sealing member includes a second protruding sealing portion that protrudes in the stacking direction; and a block-shaped seal that is disposed in a region corresponding to the crossing portion when seen in the stacking direction, the block-shaped seal being disposed independently of the second protruding sealing portion without having a crossing portion.

According to another aspect of the present disclosure, a fuel cell includes a membrane electrode assembly, in which an electrolyte membrane is disposed between a pair of electrodes; a separator that is stacked on the membrane electrode assembly, the separator including a first sealing member disposed on a first surface thereof and a second sealing member disposed on a second surface thereof.

The first separator includes a first protruding sealing portion that protrudes in a stacking direction in which the membrane electrode assembly and the separator are stacked, and a crossing portion where parts of the first protruding sealing portion are connected to each other. The second sealing member includes a second protruding sealing portion that protrudes in the stacking direction, and a block-shaped seal that is disposed in a region corresponding to the crossing portion when seen in the stacking direction, the block-shaped seal being disposed independently of the second protruding sealing portion without having a crossing portion.

According to still another aspect of the present application, a fuel cell includes a membrane electrode assembly, a first separator, and a second separator. The membrane electrode assembly includes a first electrode, a second electrode, and an electrolyte membrane. The electrolyte membrane is sandwiched in a stacking direction between the first electrode and the second electrode. The first separator is provided on the first electrode opposite to the electrolyte membrane in the stacking direction and includes a first sealing member. The first sealing member includes a first flat sealing portion, a second flat sealing portion, and a first protruding sealing portion. The first flat sealing portion faces the first electrode. The second flat sealing portion is opposite to the first electrode in the stacking direction. The first protruding sealing portion protrudes from the second flat sealing portion in the stacking direction and includes a crossing portion at which the first protruding sealing portion diverges. The second separator is provided on the second electrode opposite to the electrolyte membrane in the stacking direction and includes a second sealing member. The second sealing member includes a third flat sealing portion, a second protruding sealing portion, and a block-shaped seal. The third flat sealing portion faces the second electrode. The second protruding sealing portion protrudes from the third flat sealing portion in the stacking direction. The block-shaped seal is disposed in a region corresponding to the crossing portion viewed in the stacking direction and protruding from the third flat sealing portion apart from the second protruding sealing portion.

According to the other aspect of the present application, a fuel cell includes a membrane electrode assembly, a separator. The membrane electrode assembly includes a first electrode, a second electrode, and an electrolyte membrane. The electrolyte membrane is sandwiched in a stacking direction between the first electrode and the second electrode. The separator is provided on the membrane electrode assembly in the stacking direction and includes a sealing member. The sealing member includes a first flat sealing portion, a second flat sealing portion, a first protruding sealing portion, and a block-shaped seal. The first flat sealing portion faces the membrane electrode assembly. The second flat sealing portion is opposite to the first flat sealing portion in the stacking direction. The first protruding sealing portion protrudes from the second flat sealing portion in the stacking direction and includes a crossing portion at which the first protruding sealing portion diverges. The second protruding sealing portion protrudes from the first flat sealing portion in the stacking direction. The block-shaped seal is disposed in a region corresponding to the crossing portion viewed in the stacking direction and protrudes from the first flat sealing portion apart from the second protruding sealing portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
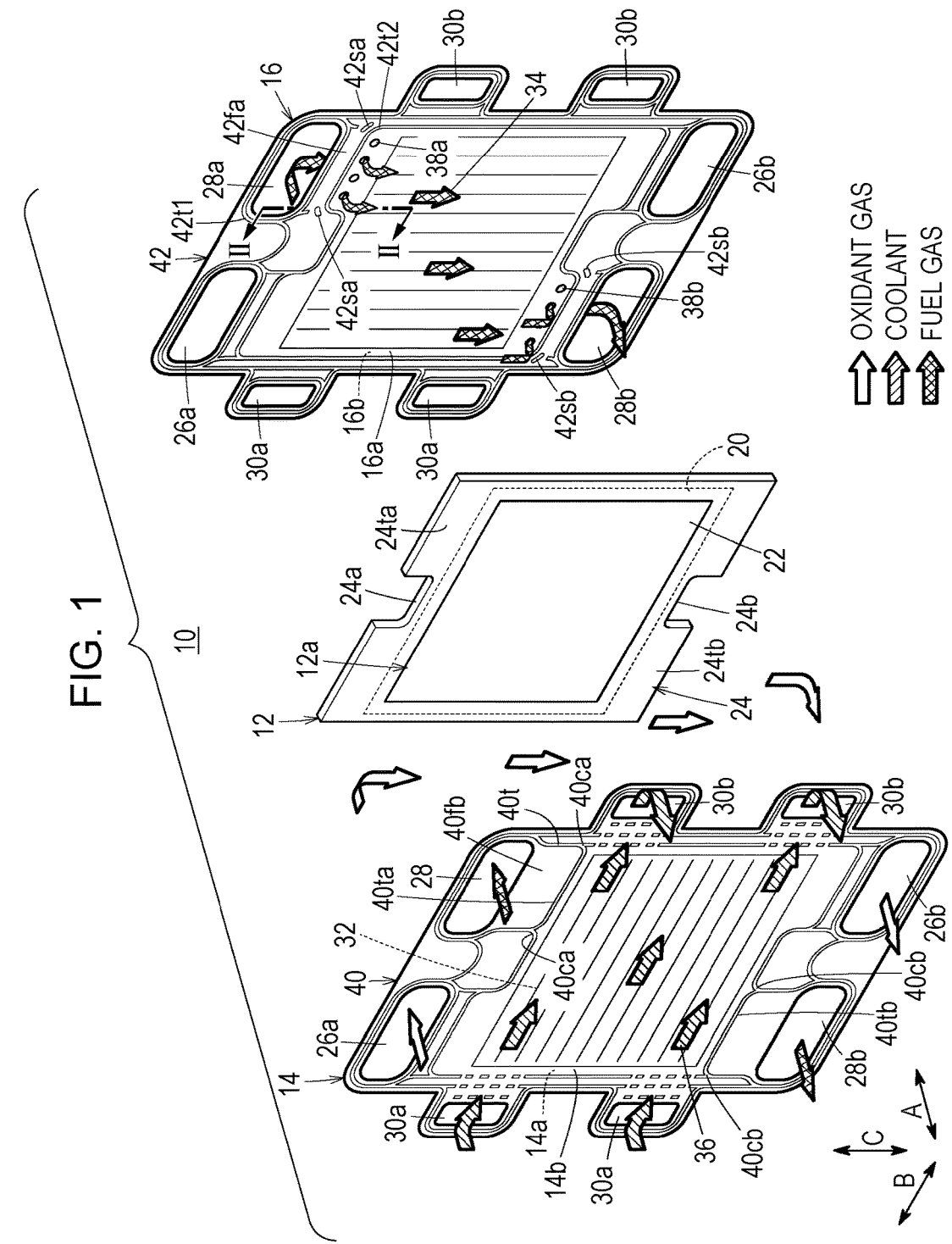
FIG. 1 is a partial exploded perspective view of a fuel cell according to a first embodiment of the present disclosure.

The embodiments will now be described with reference to the accompanying drawings, wherein like reference numerals designate corresponding or identical elements throughout the various drawings.

FIG. 1 illustrates a fuel cell 10 according to a first embodiment of the present disclosure. A fuel cell stack is formed by stacking a plurality of the fuel cells 10 in a horizontal direction (direction of arrow A) or in a vertical direction (direction of arrow C). The fuel cell stack is mounted, for example, in a fuel cell vehicle, such as a fuel cell electric automobile. A uniform fastening load is applied to the fuel cells 10 in the stacking direction.

The fuel cell 10 includes a resin-framed membrane electrode assembly 12 and a first separator 14 (cathode separator) and a second separator 16 (anode separator) that sandwich the resin-framed membrane electrode assembly 12 therebetween. Each of the first separator 14 and the second separator 16 is made by press-forming a thin metal plate into a corrugated shape. The thin metal plate is, for example, a steel plate, a stainless steel plate, an aluminum plate, a galvanized steel plate, or the like, whose surface may be coated with an anti-corrosive coating. Instead of metal separators, for example, carbon separators may be used as the first separator 14 and the second separator 16.

Figure 2:
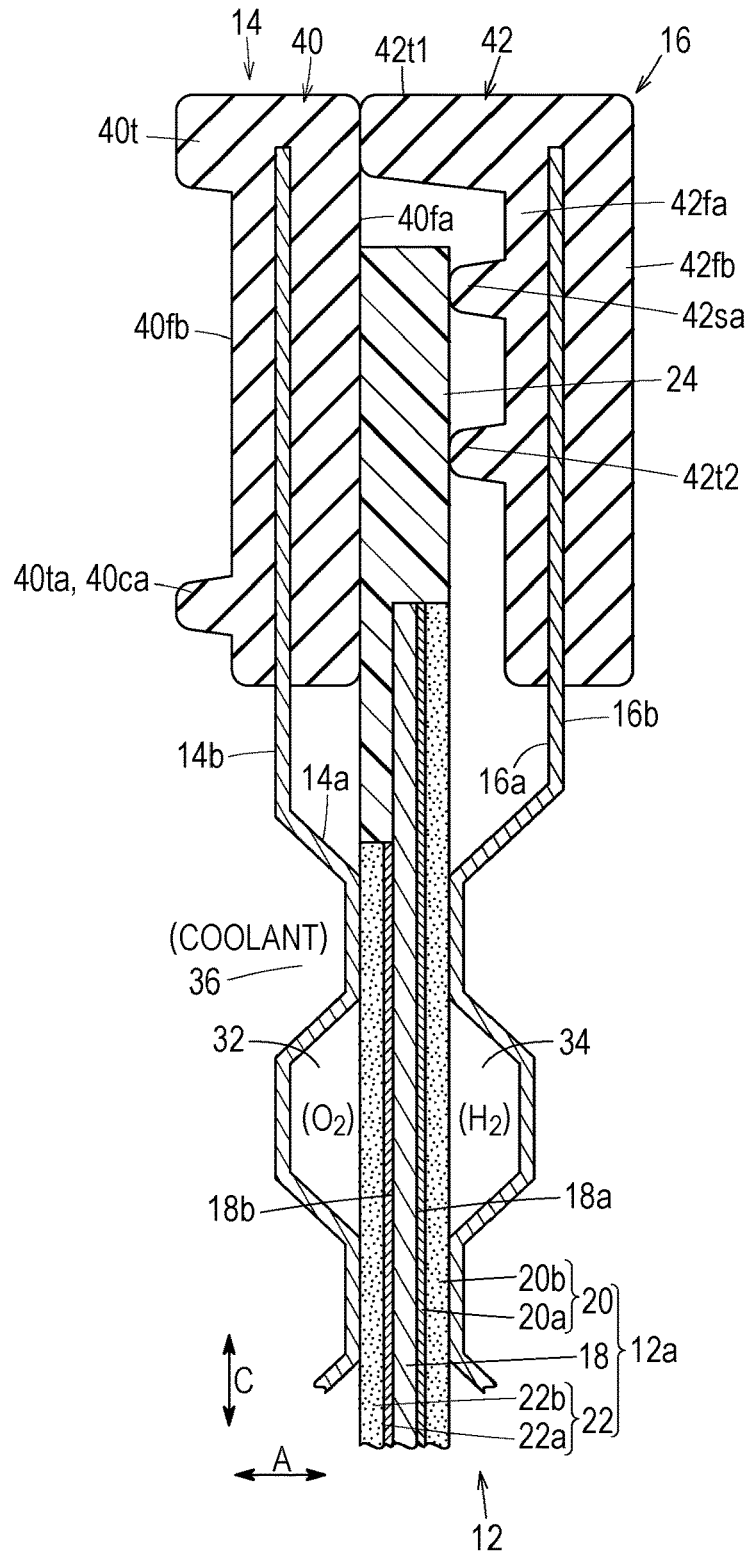
FIG. 2 is a sectional view of the fuel cell taken along line II-II of FIG. 1.

As illustrated in FIGS. 1 and 2, the resin-framed membrane electrode assembly 12 includes a membrane electrode assembly 12a, which is a so-called stepped MEA whose anode electrode and cathode electrode have different sizes in plan view. The membrane electrode assembly 12a includes a solid polymer electrolyte membrane 18 (cation exchange membrane), and an anode electrode 20 and a cathode electrode 22 sandwiching the solid polymer electrolyte membrane 18 therebetween. The solid polymer electrolyte membrane 18 is, for example, a thin film that is made of a perfluorosulfonic acid copolymer soaked with water. The solid polymer electrolyte membrane 18 may be made of a hydrocarbon (HC) electrolyte, instead of a fluorinated electrolyte.

The cathode electrode 22 has a smaller size in plan view (outer size) than the solid polymer electrolyte membrane 18 and the anode electrode 20. Alternatively, the anode electrode 20 may have a smaller size in plan view than the solid polymer electrolyte membrane 18 and the cathode electrode 22. Further alternatively, the anode electrode 20 and the cathode electrode 22 may have the same size in plan view.

The anode electrode 20 includes a first electrode catalyst layer 20a, which is joined to a surface 18a of the solid polymer electrolyte membrane 18, and a first gas diffusion layer 20b, which is stacked on the first electrode catalyst layer 20a. The first electrode catalyst layer 20a and the first gas diffusion layer 20b have outer sizes that are the same as (or different from) each other and that are the same as (or smaller than) the outer size of the solid polymer electrolyte membrane 18.

The cathode electrode 22 includes a second electrode catalyst layer 22a, which is joined to a surface 18b of the solid polymer electrolyte membrane 18, and a second gas diffusion layer 22b, which is stacked on the second electrode catalyst layer 22a. The second electrode catalyst layer 22a and the second gas diffusion layer 22b have outer sizes that are the same as (or differ from) each other and that are smaller than the outer size of the solid polymer electrolyte membrane 18.

The first electrode catalyst layer 20a is formed by, for example, uniformly coating a surface of the first gas diffusion layer 20b with porous carbon particles whose surfaces support a platinum alloy. The second electrode catalyst layer 22a is formed by, for example, uniformly coating a surface of the second gas diffusion layer 22b with porous carbon particles whose surfaces support a platinum alloy. The first gas diffusion layer 20b and the second gas diffusion layer 22b are made of carbon paper, carbon cloth, or the like. The first electrode catalyst layer 20a and the second electrode catalyst layer 22a are formed on each side of the solid polymer electrolyte membrane 18.

The resin-framed membrane electrode assembly 12 includes a resin frame member 24 that surrounds the outer periphery of the solid polymer electrolyte membrane 18 and that is joined to the anode electrode 20 and the cathode electrode 22. As illustrated in FIG. 1, recessed portions 24a and 24b (cutout portions) are respectively formed in an upper end portion and a lower end portion of the resin frame member 24, which are located substantially at the center in the direction of arrow B. Due to the presence of the recessed portion 24a, the resin frame member 24 has a protruding portion 24ta, which protrudes toward a fuel gas inlet manifold 28a (described below). Due to the presence of the recessed portion 24b, the resin frame member 24 has a protruding portion 24tb, which protrudes toward a fuel gas outlet manifold 28b (described below).

The resin frame member 24 is made of, for example, polyphenylene sulfide (PPS), polyphthalamide (PPA), polyethylene naphthalate (PEN), polyethersulfone (PES), liquid crystal polymer (LCP), polyvinylidene fluoride (PVDF), silicone resin, fluororesin, modified-polyphenyleneether (m-PPE), or the like. Otherwise, the resin frame member 24 may be made of polyethylene terephthalate (PET), polybutylene terephthalate (PBT), or modified polyolefin.

As illustrated in FIG. 1, an oxidant gas inlet manifold 26a and the fuel gas inlet manifold 28a are formed in the fuel cell 10 so as to extend in the direction of arrow A through one end portion (upper end portion) of the fuel cell 10 in the direction of arrow C (direction of gravity). An oxidant gas, such as an oxygen-containing gas, is supplied through the oxidant gas inlet manifold 26a. A fuel gas, such as a hydrogen-containing gas, is supplied through the fuel gas inlet manifold 28a.

An oxidant gas outlet manifold 26b and the fuel gas outlet manifold 28b are formed in the fuel cell 10 so as to extend in the direction of arrow A through the other end portion (lower end portion) of the fuel cell 10 in the direction of arrow C. The oxidant gas is discharged through the oxidant gas outlet manifold 26b. The fuel gas is discharged through the fuel gas outlet manifold 28b.

A pair of coolant inlet manifolds 30a are formed in one end portion of the fuel cell 10 in the direction of arrow B so as to protrude outward. A pair of coolant outlet manifolds 30b are formed in the other end portion of the fuel cell 10 in the direction of arrow B so as to protrude outward. A coolant is supplied to the coolant inlet manifolds 30a, and the coolant is discharged through the coolant outlet manifolds 30b.

An oxidant gas channel 32, which is connected to the oxidant gas inlet manifold 26a and the oxidant gas outlet manifold 26b, is formed on a surface 14a of the first separator 14 facing the resin-framed membrane electrode assembly 12. The oxidant gas flows through the oxidant gas channel 32 downward in the direction of gravity.

A fuel gas channel 34, which is connected to the fuel gas inlet manifold 28a and the fuel gas outlet manifold 28b, is formed on a surface 16a of the second separator 16 facing the resin-framed membrane electrode assembly 12. The fuel gas flows through the fuel gas channel 34 downward in the direction of gravity.

A coolant channel 36, which is connected to the coolant inlet manifolds 30a and the coolant outlet manifolds 30b, is formed between a surface 14b of the first separator 14 of the fuel cell 10 and a surface 16b of the second separator 16 of an adjacent fuel cell 10. The coolant flows through the coolant channel 36 in a horizontal direction. Alternatively, a coolant channel through which the coolant flows downward in the direction of gravity may be used.

The second separator 16 has a plurality of supply holes 38a, through which the fuel gas inlet manifold 28a is connected to the fuel gas channel 34, and a plurality of discharge holes 38b, through which the fuel gas channel 34 is connected to the fuel gas outlet manifold 28b.

As illustrated in FIGS. 1 and 2, a first sealing member 40 is integrally formed on the surfaces 14a and 14b of the first separator 14 so as to surround the outer peripheral end portion of the first separator 14. A second sealing member 42 is integrally formed on the surfaces 16a and 16b of the second separator 16 so as to surround the outer peripheral end portion of the second separator 16.

The first sealing member 40 and the second sealing member 42 are each made of an elastic material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

Figure 3:
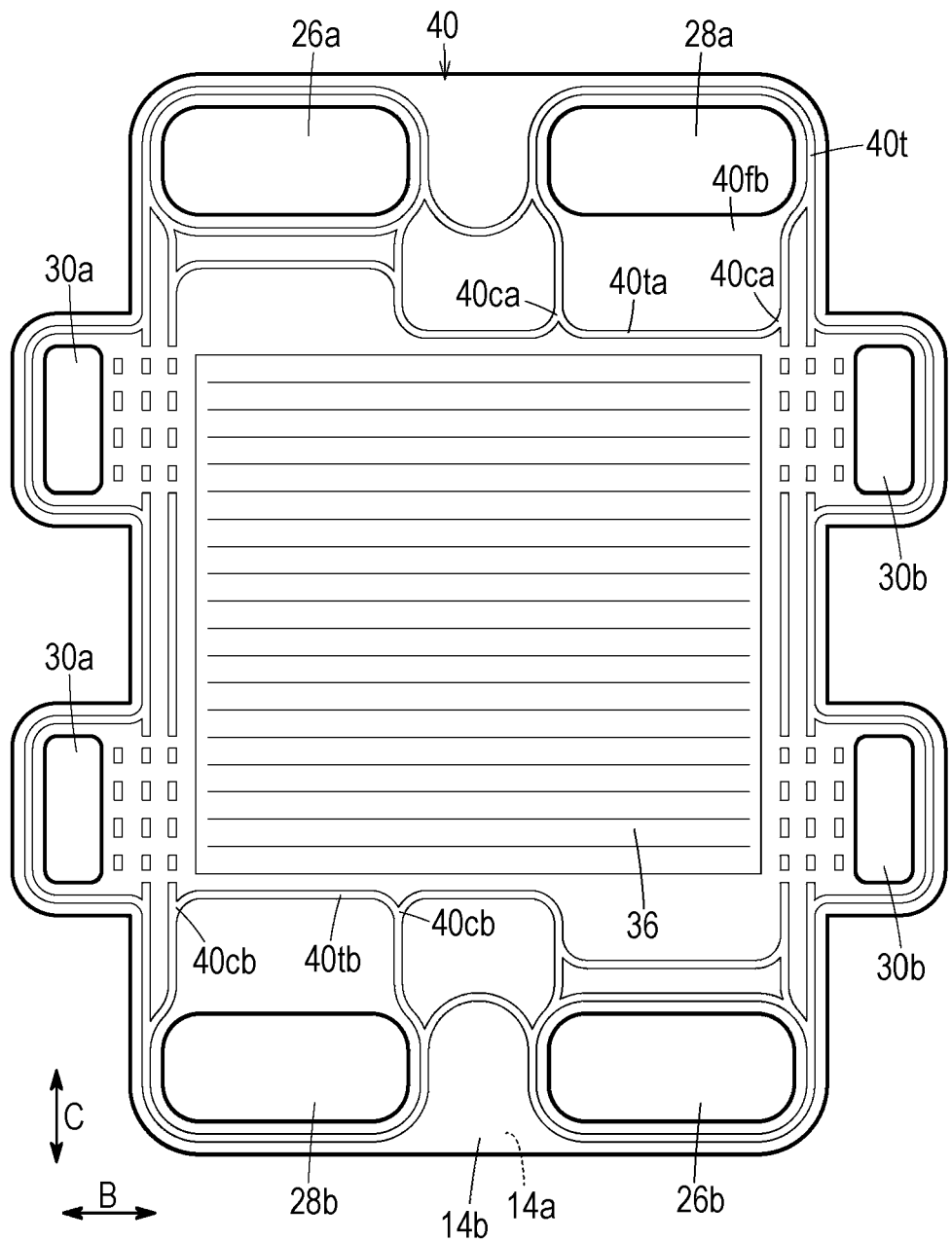
FIG. 3 is a plan view of a first separator of the fuel cell.

As illustrated in FIG. 2, the first sealing member 40 includes a flat sealing portion 40fa, which is disposed on the surface 14a of the first separator 14, and a flat sealing portion 40fb and a first protruding sealing portion 40t, which are disposed on the surface 14b of the first separator 14. As illustrated in FIGS. 1 and 3, the first protruding sealing portion 40t allows the coolant inlet manifolds 30a and the coolant outlet manifolds 30b to be connected to the coolant channel 36 and surrounds these. The first protruding sealing portion 40t individually surrounds and seals the oxidant gas inlet manifold 26a, the oxidant gas outlet manifold 26b, the fuel gas inlet manifold 28a, and the fuel gas outlet manifold 28b.

The first protruding sealing portion 40t includes a first protruding sealing portion 40ta, which is disposed below the fuel gas inlet manifold 28a, and a first protruding sealing portion 40tb, which is disposed above the fuel gas outlet manifold 28b. The first protruding sealing portion 40ta and a general portion of the first protruding sealing portion 40t (single seal line) are joined (connected) to each other at crossing portions 40ca. The first protruding sealing portion 40tb and a general portion of the first protruding sealing portion 40t are joined (connected) to each other at crossing portions 40cb.

A region surrounded by the first protruding sealing portion 40ta and the first protruding sealing portion 40t is in contact with a flat sealing portion 42fb (described below) disposed on the surface 16b of the second separator 16. Through this region, the fuel gas inlet manifold 28a is connected to the supply holes 38a on the surface 16b side. A region surrounded by the first protruding sealing portion 40tb and the first protruding sealing portion 40t is in contact with the surface 16b of the second separator 16. Through this region, the fuel gas outlet manifold 28b is connected to the discharge holes 38b on the surface 16b side.

Figure 4:
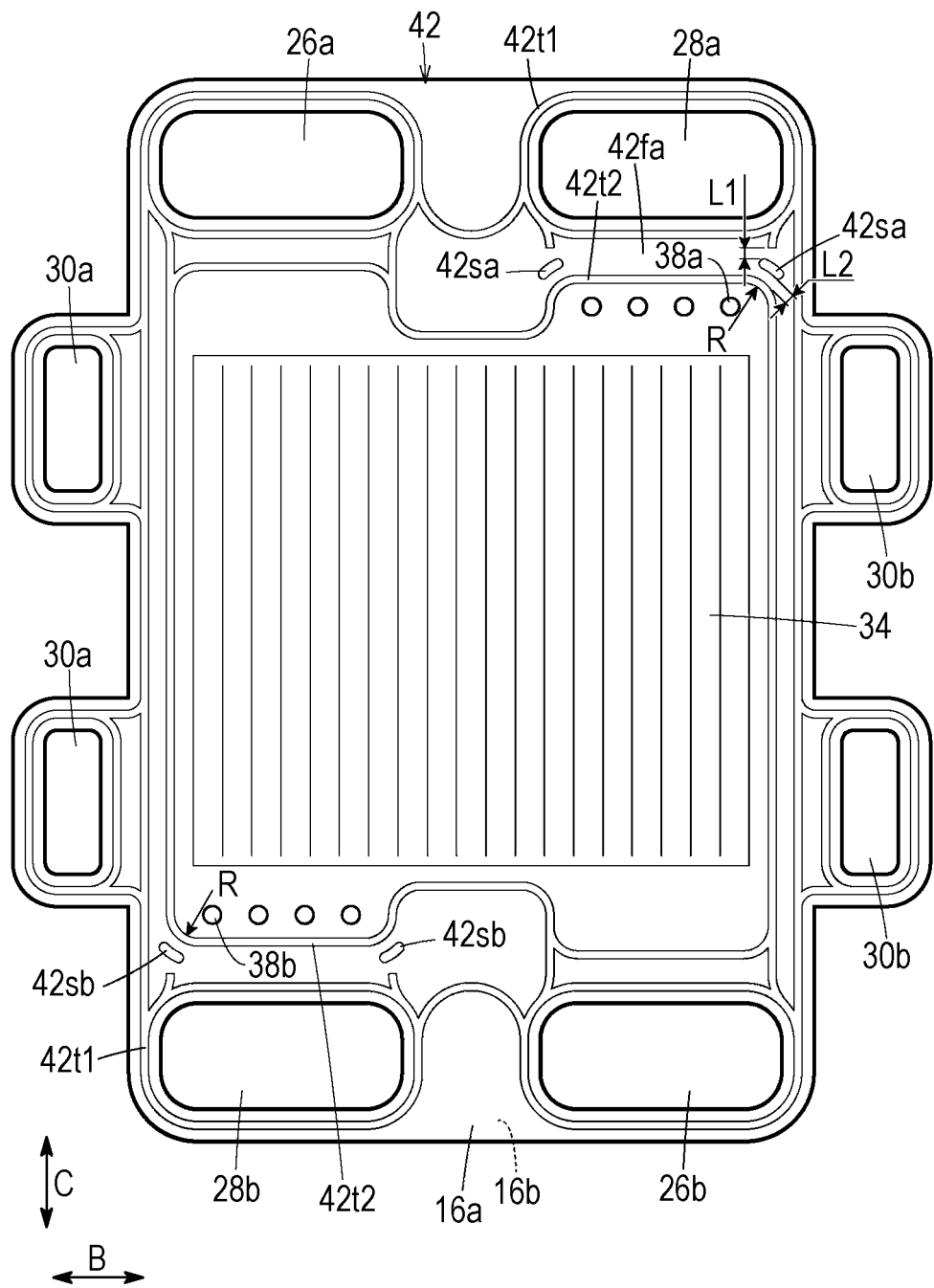
FIG. 4 is a plan view of a second separator of the fuel cell.

As illustrated in FIG. 2, the second sealing member 42 includes the flat sealing portion 42fb, which is disposed on the surface 16b of the second separator 16, and a flat sealing portion 42fa and second protruding sealing portions 42t1 and 42t2, which are disposed on the surface 16a of the second separator 16. As illustrated in FIGS. 1 and 4, the second protruding sealing portion 42t1 individually surrounds and seals the oxidant gas inlet manifold 26a, the oxidant gas outlet manifold 26b, the fuel gas inlet manifold 28a, the fuel gas outlet manifold 28b, the coolant inlet manifolds 30a, and the coolant outlet manifolds 30b.

The second protruding sealing portion 42t2, which is disposed inward of the second protruding sealing portion 42t1, connects the supply holes 38a and the discharge holes 38b to the fuel gas channel 34 and surrounds these. A pair of block-shaped sealing portions 42sa, which are disposed independently of (apart from) the second protruding sealing portions 42t1 and 42t2, are disposed between the second protruding sealing portion 42t1 and the second protruding sealing portion 42t2 in regions corresponding to the crossing portions 40ca when seen in the stacking direction.

As illustrated in FIG. 4, the block-shaped sealing portions 42sa are curved along corners R of the second protruding sealing portion 42t2 and cross vertical portions of the first protruding sealing portion 40t when seen in the stacking direction. To be specific, substantially central portions of the block-shaped sealing portions 42sa in the longitudinal direction thereof overlap the vertical portions of the first protruding sealing portion 40t when seen in the stacking direction. End portions of each of the block-shaped sealing portions 42sa in the longitudinal direction thereof extend diagonally outward from a corresponding one of the vertical portions of the first protruding sealing portion 40t toward the left and the right.

A pair of block-shaped sealing portions 42sb, which are disposed independently of (apart from) the second protruding sealing portions 42t1 and 42t2, are disposed between the second protruding sealing portion 42t1 and the second protruding sealing portion 42t2 in regions corresponding to the crossing portions 40cb when seen in the stacking direction. The block-shaped sealing portions 42sa and 42sb do not have crossing portions.

The block-shaped sealing portions 42sb are curved along corners R of the second protruding sealing portion 42t2 and cross vertical portions of the first protruding sealing portion 40t when seen in the stacking direction. To be specific, substantially central portions of the block-shaped sealing portions 42sb in the longitudinal direction thereof overlap the vertical portions of the first protruding sealing portion 40t when seen in the stacking direction. End portions of each of the block-shaped sealing portions 42sb in the longitudinal direction thereof extend diagonally outward from a corresponding one of the vertical portions of the first protruding sealing portion 40t toward the left and the right. The block-shaped sealing portions 42sa and 42sb are integrally formed with the second sealing member 42 from the same material.

Figure 5:
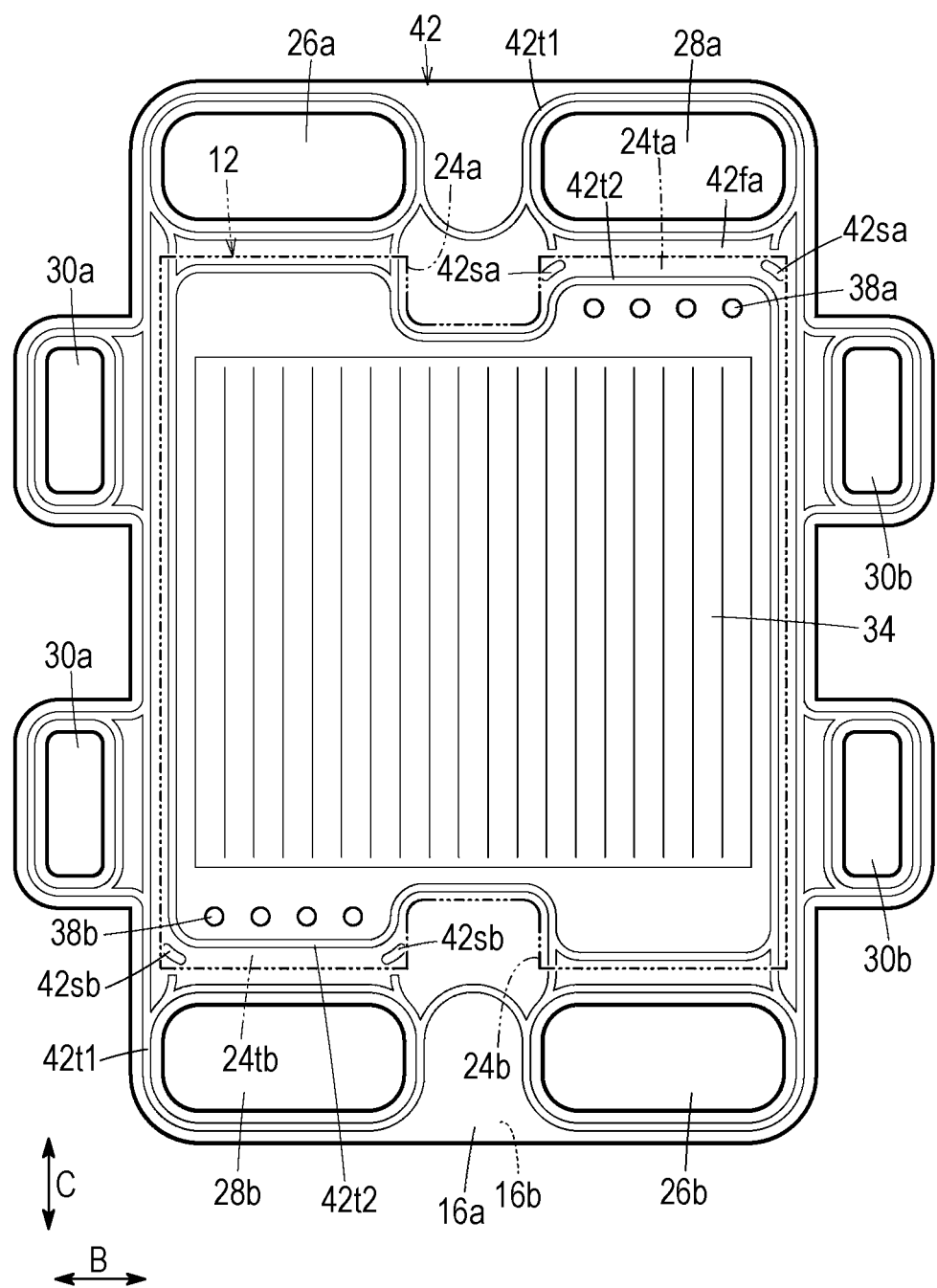
FIG. 5 is a plan view of the second separator, on which a resin-framed membrane electrode assembly is stacked.

As illustrated in FIG. 5, the pair of block-shaped sealing portions 42sa are disposed at positions overlapping the protruding portion 24ta of the resin frame member 24 when seen in the stacking direction. The block-shaped sealing portions 42sa are disposed so as to be inclined along the corners of the protruding portion 24ta. As illustrated in FIG. 4, the block-shaped sealing portions 42sa are separated from the second protruding sealing portion 42t1 by a predetermined distance L1, which is in the range of, for example, 1 mm to 3 mm and preferably 1.5 mm to 2.0 mm. The block-shaped sealing portions 42sa are separated from the second protruding sealing portion 42t2 by a predetermined distance L2 in the range of, for example, 0.5 mm to 2.5 mm and preferably 1.0 mm to 2.0 mm.

As illustrated in FIG. 5, the pair of block-shaped sealing portions 42sb are disposed at positions overlapping the protruding portion 24tb of the resin frame member 24 when seen in the stacking direction. The block-shaped sealing portions 42sb are disposed so as to be inclined along the corners of the protruding portion 24tb. The block-shaped sealing portions 42sb have a structure similar to that of the pair of block-shaped sealing portions 42sa described above.

Hereinafter, an operation of the fuel cell 10 having such a structure will be described.

First, as illustrated in FIG. 1, an oxidant gas, such as an oxygen-containing gas, is supplied to the oxidant gas inlet manifold 26a, and a fuel gas, such as a hydrogen-containing gas, is supplied to the fuel gas inlet manifold 28a. A coolant, such as pure water, ethylene glycol, oil, or the like is supplied to the pair of coolant inlet manifolds 30a.

The oxidant gas flows through the oxidant gas inlet manifold 26a into the oxidant gas channel 32 of the first separator 14, flows downward in the direction of gravity (direction of arrow C), and is supplied to the cathode electrode 22 of the resin-framed membrane electrode assembly 12. The fuel gas flows through the fuel gas inlet manifold 28a and the supply holes 38a into the fuel gas channel 34 of the second separator 16. The fuel gas flows along the fuel gas channel 34 downward in the direction of gravity (direction of arrow C), and is supplied to the anode electrode 20 of the resin-framed membrane electrode assembly 12.

Accordingly, in the resin-framed membrane electrode assembly 12, the oxidant gas supplied to the cathode electrode 22 and the fuel gas supplied to the anode electrode 20 are consumed in electrochemical reactions in the second electrode catalyst layer 22a and the first electrode catalyst layer 20a, and thereby electric power is generated.

Next, the oxidant gas suppled to the cathode electrode 22 and consumed is discharged through the oxidant gas outlet manifold 26b in the direction of arrow A. The fuel gas supplied to the anode electrode 20 and consumed passes through the discharge holes 38b and is discharged through the fuel gas outlet manifold 28b in the direction of arrow A.

The coolant supplied to the coolant inlet manifolds 30a flows into the coolant channel 36 between the first separator 14 and the second separator 16 and flows in a horizontal direction (direction of arrow B). The coolant cools the membrane electrode assembly 12a, and then the coolant is discharged through the coolant outlet manifolds 30b.

In the first embodiment, as illustrated in FIG. 1, the second sealing member 42 includes the block-shaped sealing portions 42sa and 42sb, which are disposed in regions corresponding to the crossing portions 40ca and 40cb of the first sealing member 40 in the stacking direction. The block-shaped sealing portions 42sa and 42sb do not have crossing portions (see FIGS. 4 and 5).

Therefore, in the block-shaped sealing portions 42sa and 42sb, a surface-contact pressure difference, which usually occurs between a crossing portion and a general portion (single sealing portion), is considerably reduced, and a local increase of surface-contact pressure can be reliably suppressed. Accordingly, the first embodiment provides the following advantages: an increase of surface-contact pressure on the second sealing member 42 can be effectively suppressed; the flexibility in designing the shape of the sealing member can be particularly increased; and the fuel cell can be structured compactly.

The resin-framed membrane electrode assembly 12 includes a resin frame member 24, which surrounds the outer peripheral end portion of the membrane electrode assembly 12a. The block-shaped sealing portions 42sa and 42sb are disposed at positions overlapping the resin frame member 24 when seen in the stacking direction (see FIG. 5). Thus, an increase of a seal-surface-contact pressure related to the resin frame member 24 can be reliably suppressed.

Figure 6:
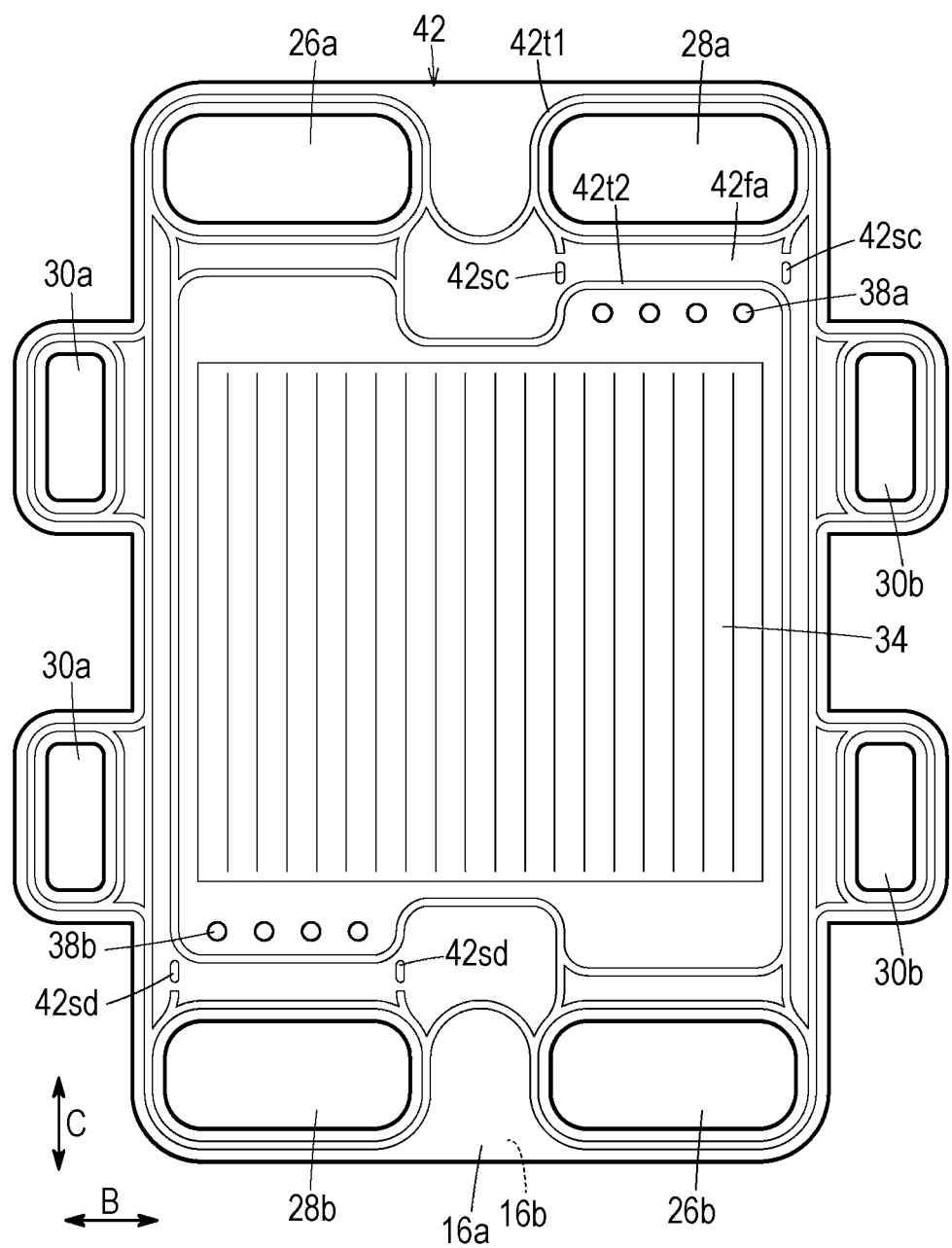
FIG. 6 is a plan view of a second separator of a fuel cell according to a second embodiment of the present disclosure.

FIG. 6 is a plan view of a second separator 52 of a fuel cell 50 according to a second embodiment of the present disclosure. Elements of the fuel cell 50 that are the same as those of the fuel cell 10 according to the first embodiment will be denoted by the same reference numerals and detailed descriptions of such elements will be omitted. Likewise, detailed descriptions of such elements will be omitted in a third embodiment described below.

The second separator 52 is made from a metal plate or a carbon plate and includes a second sealing member 42. The second sealing member 42 includes block-shaped sealing portions 42sc and 42sd, instead of the block-shaped sealing portions 42sa and 42sb. The block-shaped sealing portions 42sc and 42sd extend in the direction of arrow C and do not have crossing portions.

As with the first embodiment, the second embodiment structured as described above provides, for example, the following advantages: a local increase of surface-contact pressure on the second sealing member 42 can be effectively suppressed; and the flexibility in designing the shape of the sealing member can be particularly increased.

In each of the first and second embodiments, a so-called single-cell cooling structure is used, which is a structure in which a fuel cell includes two separators sandwiching a resin-framed membrane electrode assembly therebetween and a coolant channel is formed between the fuel cell and an adjacent fuel cell. However, this is not a limitation. For example, a so-called skipped cooling structure may be used, which is a structure in which a cell unit includes three or more separators and two or more resin-framed membrane electrode assemblies that are alternately stacked, and a coolant channel is formed between the cell unit and an adjacent cell unit.

The second separators 16 and 52 have the supply holes 38a and the discharge holes 38b. However, this is not a limitation. For example, a plurality of grooves may be formed in a separator surface, and a supply channel and a discharge channel may be formed by covering the grooves with a cover member.

The positions of the crossing portion and the block-shaped sealing portion are not limited to those described in the first and second embodiments. They may be disposed in any appropriate regions where portions of the seal cross each other. The membrane electrode assembly need not be a resin-framed membrane electrode assembly but may be a membrane electrode assembly that does not have resin frame.

Figure 7:
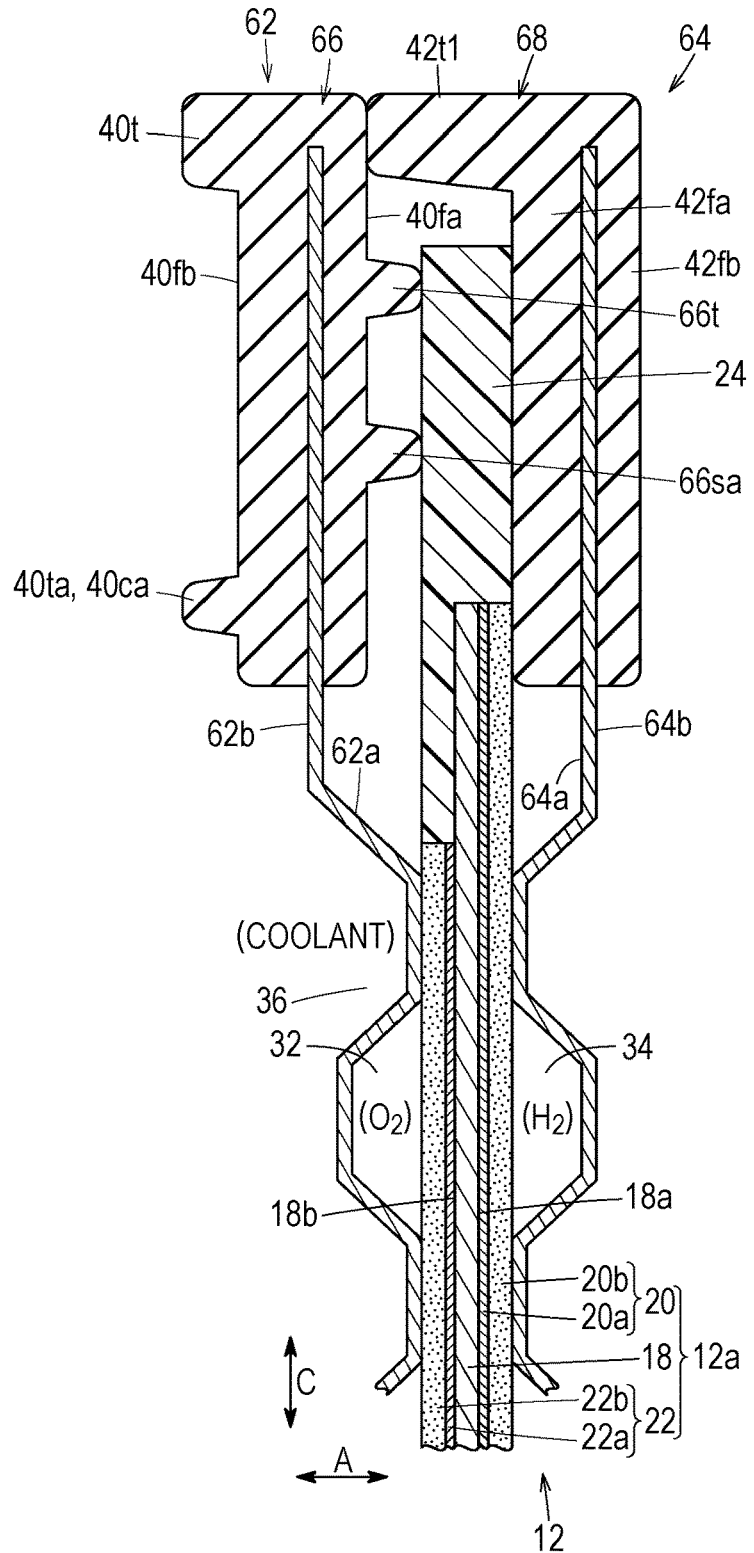
FIG. 7 is a sectional view, corresponding to FIG. 2, of a fuel cell according to a third embodiment of the present disclosure.

FIG. 7 is a sectional view, corresponding to FIG. 2, of a fuel cell 60 according to a third embodiment of the present disclosure.

The fuel cell 60 includes a first separator 62 (cathode separator) and a second separator 64 (anode separator) that sandwich the resin-framed membrane electrode assembly 12 therebetween. Each of the first separator 62 and the second separator 64 is, for example, a metal separator or a carbon separator.

A first sealing member 66 is integrally formed on surfaces 62a and 62b of the first separator 62 so as to surround the outer peripheral end portion of the first separator 62. A second sealing member 68 is integrally formed on surfaces 64a and 64b of the second separator 64 so as to surround the outer peripheral end portion of the second separator 64.

The first sealing member 66 includes the flat sealing portion 40fa, which is disposed on the surface 62a of the first separator 62, and a second protruding sealing portion 66t, which is integrally formed on the flat sealing portion 40fa. Block-shaped sealing portion 66sa, which are disposed independently of (apart from) the second protruding sealing portion 66t, are formed on the flat sealing portion 40fa in regions corresponding to the crossing portions 40ca when seen in the stacking direction.

Thus, in the third embodiment, the flat sealing portion 40fb (first sealing member) is disposed on the surface 62b of the first separator 62, and the flat sealing portion 40fa (second sealing member) is disposed on the surface 62a of the first separator 62. The flat sealing portion 40fb includes the crossing portions 40ca. The flat sealing portion 40fa includes the block-shaped sealing portions 66sa, which are disposed independently without having crossing portions, in regions corresponding to the crossing portions 40ca when seen in the stacking direction.

Accordingly, in the block-shaped sealing portion 66sa, a surface-contact pressure difference, which usually occurs between a crossing portion and a general portion (single sealing portion), is considerably reduced, and a local increase of surface-contact pressure can be reliably suppressed. Thus, as with the first and second embodiments, the third embodiment provides, for example, the following advantages: the flexibility in designing the shape of the seal can be increased; and the fuel cell can be structured compactly.

The sealing member has a complex shape so that the sealing member can seal a fluid channel, which extends in a direction along surfaces of the separators, and a fluid manifold, which extends in a direction in which the separators are stacked. For example, some sealing members have a crossing portion where two protruding sealing portions cross each other and are connected to each other. However, when such a sealing member is compressed in the stacking direction, a local increase of surface-contact pressure may occur at the crossing portion. It has been pointed out that this may cause deformation of the sealing member and a decrease of sealability.

The present application describes a fuel cell that can effectively suppress a local increase of surface-contact pressure on the sealing member, that can particularly increase the flexibility in designing the shape of the sealing member, and that can be structured compactly.

According to a first aspect of the present disclosure, a fuel cell includes a membrane electrode assembly, in which an electrolyte membrane is disposed between a pair of electrodes; a first separator stacked on the membrane electrode assembly; and a second separator stacked on the membrane electrode assembly. In the fuel cell, the first separator includes a first sealing member, and the second separator, which is adjacent to the first separator, includes a second sealing member. According to a second aspect of the present disclosure, a fuel cell includes a membrane electrode assembly and a separator stacked on the membrane electrode assembly. In the fuel cell, the separator includes a first sealing member disposed on a first surface thereof and a second sealing member disposed on a second surface thereof.

The first sealing member includes a first protruding sealing portion that protrudes in a stacking direction in which the membrane electrode assembly and the separators are stacked, and a crossing portion where parts of the first protruding sealing portion are connected to each other. The second sealing member includes a second protruding sealing portion that protrudes in the stacking direction; and a block-shaped seal that is disposed in a region corresponding to the crossing portion when seen in the stacking direction, the block-shaped seal being disposed independently of the second protruding sealing portion without having a crossing portion.

Preferably, in the fuel cell, the membrane electrode assembly includes a resin frame member that surrounds an outer peripheral end portion of the electrolyte membrane, and the block-shaped seal is disposed at a position overlapping the resin frame member when seen in the stacking direction.

Preferably, in the fuel cell, the block-shaped seal is disposed at a position overlapping a corner of the resin frame member when seen in the stacking direction.

With the present disclosure, the second sealing member includes the block-shaped seal, which is disposed in a region corresponding to the crossing portion of the first sealing member when seen in the stacking direction, and the block-shaped seal does not have a crossing portion. Therefore, a surface-contact pressure difference, which occurs between a crossing portion and a general portion (single protruding sealing portion), is considerably reduced and a local increase of surface-contact pressure can be reliably suppressed. Accordingly, a local increase of stress in the sealing member can be effectively suppressed, the flexibility in designing the shape of the sealing member can be particularly increased, and the fuel cell can be structured compactly.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
a membrane electrode assembly in which an electrolyte membrane is disposed between a pair of electrodes;
a first separator stacked on the membrane electrode assembly, the first separator including a first sealing member; and
a second separator stacked on the membrane electrode assembly, the second separator being adjacent to the first separator and including a second sealing member,
wherein the first sealing member includes:
  a first protruding sealing portion that protrudes in a stacking direction in which the membrane electrode assembly and the separators are stacked, and
  a crossing portion where three parts of the first protruding sealing portion are connected to each other,
wherein the second sealing member includes:
  a second protruding sealing portion that protrudes in the stacking direction, and
  a block-shaped seal that is disposed in a region corresponding to the crossing portion when seen in the stacking direction, the block-shaped seal being disposed independently of the second protruding sealing portion,
wherein the block-shaped seal has a block shape spaced apart from the second protruding sealing portion as viewed in the stacking direction,
wherein the crossing portion is a location at which three of the parts of the first protruding sealing portion extend therefrom each in directions perpendicular to the stacking direction and is defined at an intersection between parts of the first protruding sealing portion that converge at the crossing portion, and
wherein the block-shaped seal is disposed to overlap the region corresponding to the crossing portion in the stacking direction and the block-shaped seal is disposed to not directly overlap the crossing portion in the stacking direction to reduce local surface-contact pressure on the second sealing member.

2. The fuel cell according to claim 1,
wherein the membrane electrode assembly includes a resin frame member that surrounds an outer peripheral end portion of the electrolyte membrane, and
wherein the block-shaped seal is disposed at a position overlapping the resin frame member when seen in the stacking direction.

3. The fuel cell according to claim 2,
wherein the block-shaped seal is disposed at a position overlapping a corner of the resin frame member when seen in the stacking direction.

4. The fuel cell according to claim 1,
wherein the second separator includes a plurality of gas supply holes, the block-shaped seal being disposed outward of the plurality of gas supply holes in a direction orthogonal to the stacking direction and towards an outer periphery of the second separator.

5. The fuel cell according to claim 1,
wherein the block-shaped seal includes a pair of opposed side walls that protrude in the stacking direction, the pair of opposed side walls being integrally formed with and extending from the second sealing member.

6. The fuel cell according to claim 5,
wherein the pair of opposed side walls of the block-shaped seal are spaced apart from the second protruding sealing portion.

* * * * *